Aug. 12, 1924.
J. R. VAN AUKEN
1,504,919
ELECTRICAL CONNECTER AND TERMINAL
Filed Dec. 19, 1922    2 Sheets-Sheet 1
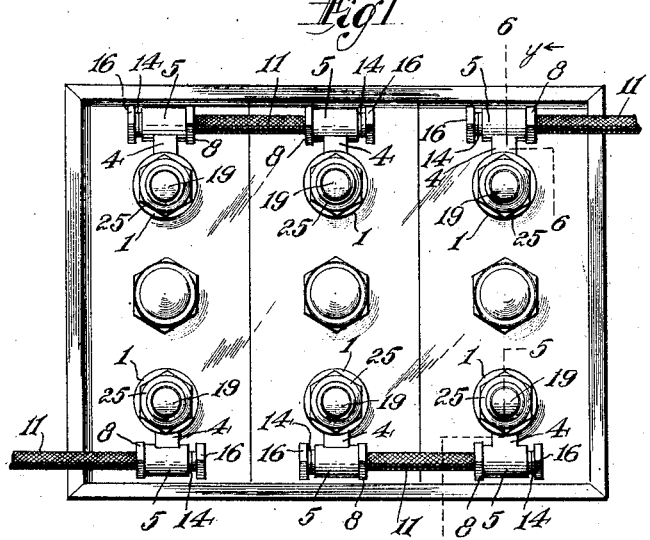
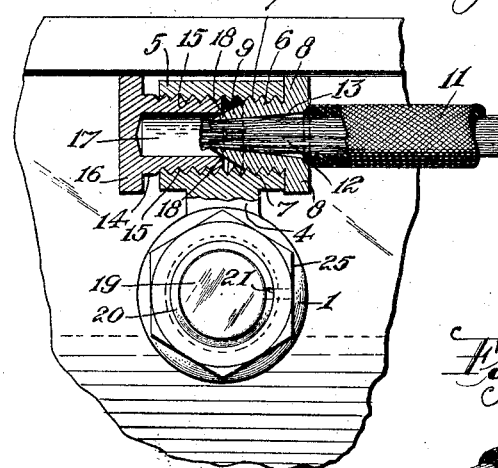
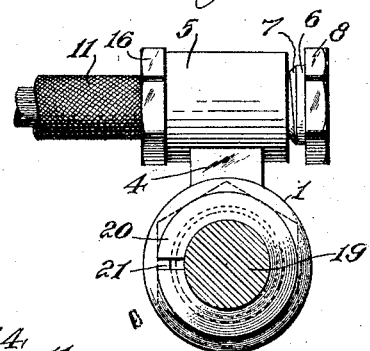
INVENTOR:
James R. Van Auken
BY
Fraentzel and Richards
ATTORNEYS

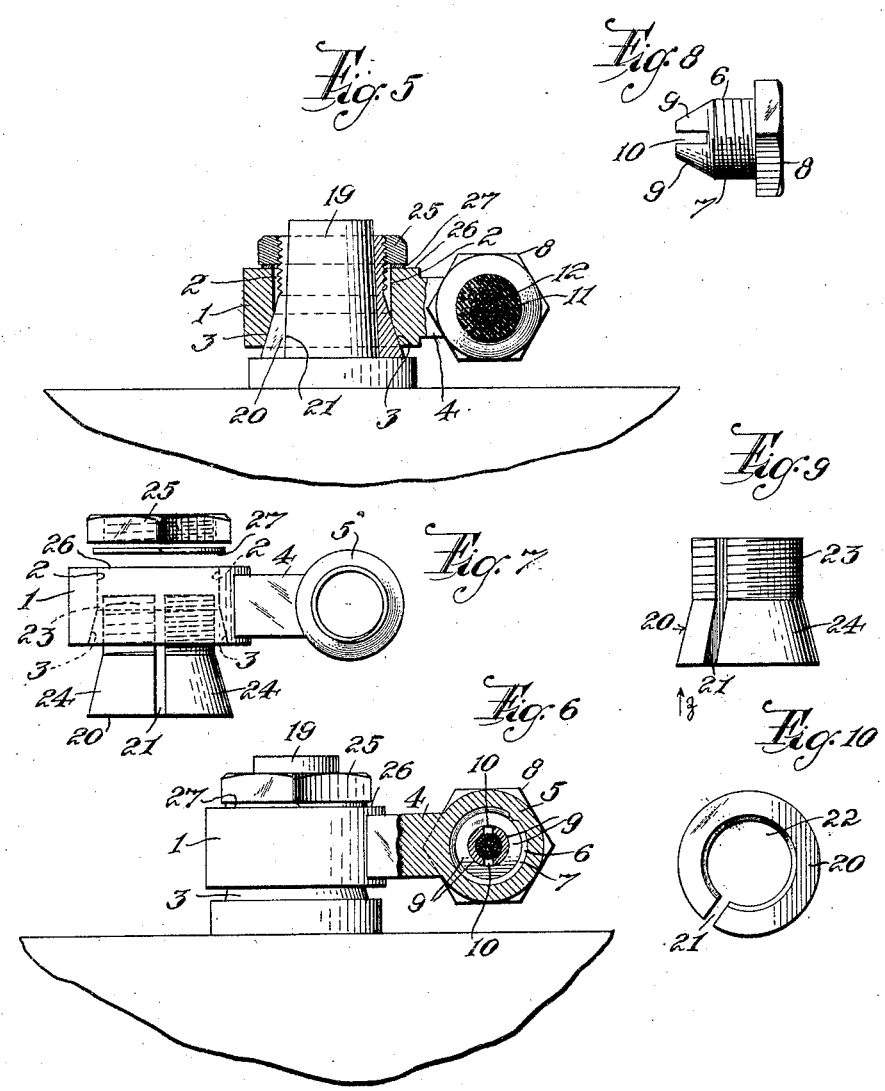

Patented Aug. 12, 1924.

1,504,919

UNITED STATES PATENT OFFICE.

JAMES R. VAN AUKEN, OF NEWARK, NEW JERSEY.

ELECTRICAL CONNECTER AND TERMINAL.

Application filed December 19, 1922. Serial No. 607,805.

*To all whom it may concern:*

Be it known that I, JAMES R. VAN AUKEN, a citizen of the United States, residing at Newark, in the county of Essex and State of New Jersey, have invented certain new and useful Improvements in Electrical Connecters and Terminals; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in electrical connecters; and, the present invention relates, more particularly, to improvements in connecters and terminals for storage batteries, and especially to that class of batteries for use with automobiles.

The present invention, therefore, has for its principal object to provide a novel and simply constructed connecter and terminal which may be employed to connect the adjacent cells of a battery, and which, is furthermore adapted for use with the terminals of the battery for electrical connection of the usual flexible cables to said terminals.

The invention has for its further object to provide a connecter or terminal for storage batteries the parts of which are such construction that they are readily separated, and are adapted to be easily and quickly assembled in an efficient and positive relation to each, so as to maintain a perfect electrical contact between the several members of the connecter and terminal.

Other objects of the present invention not at this time more particularly enumerated will be clearly understood from the following detailed description of the said invention.

With the various objects of the present invention in view, the said invention consists, primarily, in the novel connecter and terminal hereinafter more fully set forth; and, the said invention consists, furthermore, in the novel arrangements and combinations of the several devices and parts, as well as in the details of the construction of the said parts, all of which will be more fully described in the following specification, and then finally embodied in the clauses of the claims, which are appended to and which form an essential part of the said specification.

The invention is clearly illustrated in the accompanying drawings, in which:—

Figure 1 is a top or plan view of a storage battery, showing the usual cells in their assembled relation in the battery-box, and illustrating further, in connection therewith, the novel connecter and terminal embodying the principles of the present invention.

Figure 2 is a plan view of a fragmentary portion of one of the battery-cells, and one of the connecters, the connecter being shown partly in plan and partly in horizontal section for connection with the connecter of an end portion of a flexible cable, said view being made on an enlarged scale.

Figure 3 is a reverse view of the connecter, the battery-post or terminal with which the connecter is employed being represented in horizontal section; and Figure 4 is a perspective view of an end-portion of a cable adapted for connection to the connecter.

Figure 5 is a vertical sectional representation on an enlarged scale, said section being taken on line 5—5 in said Figure 1, looking in the direction of the arrow $x$; and Figure 6 is another vertical sectional representation, also on an enlarged scale, said section being taken on line 6—6 in said Figure 1, looking in the direction of the arrow $y$.

Figure 7 is a collective view of the several members of the connecter, showing the manner of bringing the several members into their assembled and connected relations; Figure 8 is a side elevation of a slitted connecter-sleeve for attachment of the metallic end-portion of a flexible cable to the connecter; Figure 9 is a similar view of a slitted and cone-shaped binding member for attachment of the connecter to a battery-port or terminal; and Figure 10 is an end view of said binding member, looking in the direction of the arrow $z$ in said Figure 9.

Similar characters of references are employed in all of the said herein-above described views, to indicate corresponding parts.

Referring now to the several figures of the drawings, the connecter and terminal consists, essentially, of a main body comprising a main sleeve-member 1 which is formed with a hole, one portion of which is of cylindrical configuration, as at 2, and another portion of which is of conical configuration, as at 3. Connected with said main sleeve-member 1, by means of a laterally extending arm 4, or in any other suitable manner, is a second sleeve-member 5, located in a manner, substantially as shown in Figures 1, 2, 3, 5, 6 and 7 of the drawings.

As shown more particularly in Figure 2 of the drawings, this sleeve-member 5 is internally screw-threaded for screwing into one end of said member a tubular stud 6, which is externally screw-threaded, as at 7, and at its outer end is formed with a polygonally or other suitably shaped flange 8, for the application thereto of a wrench or other suitable tightening tool. At its inner end-portion, the said stud 6 is suitably tapered or made cone-shaped, as at 9, said tapered or cone-shaped end being suitably slitted, as at 10, so as to provide suitable clamping or grasping members, adapted to positively grip the metallic conductor end 12 of the cable 11, when said end is passed into and through the tubular portion 13 of the stud, as shown in said Figure 2, and in a manner to be presently described.

Screwed into the other end of said sleeve-member 5 is the externally screw-threaded portion 15 of a binding stud 14, said stud being also provided at its outer end with a polygonally or other suitably shaped flange 16, for the application thereto of a wrench or other suitable tightening tool. The interior of the said binding stud 14 is made with a cylindrically shaped chamber or socket, as 17. From an inspection of said Figure 2 it will be seen, that when the metallic conductor end 12 of the cable 11 has been inserted in the tubular portion 13 of the stud 6, and the latter has been screwed into the one end of the sleeve-member 5, and when the binding stud 14 has been screwed into the other end of said sleeve-member 5, that the edge portion 18 of the chamber or socket 17 of the said binding stud 14, forcibly engages the tapered or cone-shaped end of the stud 6, so that the previously mentioned grasping or clamping members of the said tapered or cone-shaped end will positively and securely engage the metallic conductor end 12 of the cable 11, so that the end of the cable is secured in its position against accidental displacement, and that a perfect electrical contact between the metallic members will be the result.

Referring now to Figures 1, 2, 3 and 5 of the drawings, the reference-character 19 indicates a battery-post upon which is mounted a binding ring or sleeve 20 provided with a bore 22, so as to be properly fitted upon said post, as will be evident, the said ring or sleeve being also longitudinally slitted, as at 21. The upper portion of the said ring or sleeve is externally screw-threaded, as at 23, and its lower portion is tapered or made cone-shaped, as at 24, for the reception thereon of the cone-shaped portion 3 of the hole with which the previously mentioned sleeve-member 1 is provided. When the said ring or sleeve 20 has thus been mounted upon the battery post 19, and the sleeve-member 1 has been placed over the said ring or sleeve 20, in the manner shown more particularly in Figure 5 of the drawings, then a tightening nut 25 is screwed down upon the screw-threaded portion of the said ring or sleeve 20 which projects above the upper surface 26 of the sleeve-member 1, thereby bringing the tapered or cone-shaped surface-portions 3 and 24 of the respective elements in perfect and positive electrical contact, and the slit 21 of the said ring or sleeve 20 permitting the parts to be brought into a firm and a securely clamped relation, so that there will be no accidental displacement of these parts, due to vibration or other causes. If desired, a lock-washer, as 27, may be placed between the surface 26 of the sleeve-member 1 and the tightening nut 25, but the use of such washer 27 is not an absolute necessity.

In practice, I prefer to cast or mould the connected sleeve-members 1 and 5 in lead, the remaining members being made in brass. It will be understood, however, that the said connected sleeve-members 1 and 5 may also be made of brass, or any other suitable metal which is a good conductor of electricity may be used in the construction of the several parts.

From the foregoing description of the present invention it will be readily seen that I have produced a device which is simple in its construction and is useful as a connecter for electrically connecting adjacent battery cells, or as a terminal for use in connection with the posts of the end cells of a battery, as will be clearly understood from an inspection of Figure 1 of the drawings.

While the present invention is particularly adapted for use with that class of storage battery employed in connection with automobiles, the invention is also useful at battery service stations; furthermore, owing to the construction of the various parts of the device an effective and positive electric contact is produced, and there is no likelihood of the contact being broken due to the vibrations and jars to which a battery is subjected with the starting, lighting and ignition systems of automobiles.

I am also aware that some changes may be made in the general arrangements and combinations of the various devices and parts, as well as in the details of the construction of the said parts, without departing from the scope of the present invention as set forth in the foregoing specification. Hence, I do not limit my present invention to the exact arrangements and combinations of the various devices and parts as described in the said specification, nor do I confine myself to the exact details of the construction of said parts as illustrated in the accompanying drawings.

I claim:—

1. A connecter and terminal for storage batteries, comprising a pair of sleeve-members, one of said members being provided with a hole having a cylindrical portion and a cone-shaped portion, a binding sleeve in said hole, said sleeve being longitudinally slitted and having a cylindrical portion and a cone-shaped portion adapted to be fitted upon the cylindrical and cone-shaped portions of the said sleeve-member, said binding sleeve being adapted to be fitted upon a battery-post, means connected with said binding sleeve for locking said sleeve-member and said binding sleeve against displacement upon the battery-post, a tubular stud in one end of the other sleeve-member, said tubular stud being adapted to receive the metallic conductor-end of a cable, a binding stud in the other end of said second-mentioned sleeve-member, and means connected with said binding stud adapted to be brought in engagement with said first-mentioned tubular stud for securing the metallic conductor-end of the cable against displacement from within said tubular stud.

2. A connecter and terminal for storage batteries, comprising a pair of sleeve-members, one of said members being provided with a hole having a cylindrical portion and a cone-shaped portion, a binding sleeve in said hole, said sleeve being longitudinally slitted and having a cylindrical portion and a cone-shaped portion adapted to be fitted upon the cylindrical and cone-shaped portions of the said sleeve-member, said binding sleeve being adapted to be fitted upon a battery-post, means connected with said binding sleeve for locking said sleeve-member and said binding sleeve against displacement upon the battery-post, a tubular stud in one end of the other sleeve-member, said tubular stud being adapted to receive the metallic conductor-end of a cable, said tubular stud being further formed with a slitted cone-shaped end-portion providing clamping members, a binding stud in the other end of said second-mentioned sleeve-member, and means connected with said binding stud adapted to be brought in engagement with said clamping members for securing the metallic conductor-end of the cable against displacement from within said tubular stud.

3. A connecter and terminal for storage batteries, comprising a pair of sleeve-members, one of said members being provided with a hole having a cylindrical portion and a cone-shaped portion, a binding sleeve in said hole, said sleeve being longitudinally slitted and having a cylindrical portion and a cone-shaped portion adapted to be fitted upon the cylindrical and cone-shaped portions of the said sleeve-member, said binding sleeve being adapted to be fitted upon a battery-post, means connected with said binding sleeve for locking said sleeve-member and said binding sleeve against displacement upon the battery-post, said other sleeve-member being internally screw-threaded, an externally screw-threaded tubular stud screwed into one end of said last-mentioned sleeve-member, said tubular stud being adapted to receive the metallic conductor-end of a cable, an externally screw-threaded binding stud screwed into the other end of said last-mentioned sleeve-member, and means connected with said binding stud adapted to be brought into engagement with said first-mentioned tubular stud for securing the metallic conductor-end of the cable against displacement from within said tubular stud.

4. A connecter and terminal for storage batteries, comprising a pair of sleeve-members, one of said members being provided with a hole having a cylindrical portion and a cone-shaped portion, a binding sleeve in said hole, said sleeve being longitudinally slitted and having a cylindrical portion and a cone-shaped portion adapted to be fitted upon the cylindrical and cone-shaped portions of the said sleeve-member, said binding sleeve being adapted to be fitted upon a battery-post, means connected with said binding sleeve for locking said sleeve-member and said binding sleeve against displacement upon the battery-post, said other sleeve-member being internally screw-threaded, an externally screw-threaded tubular stud screwed into one end of said last-mentioned sleeve-member, said tubular stud being adapted to receive the metallic conductor-end of a cable, said tubular stud being further formed with a slitted cone-shaped end-portion providing clamping members, an externally screw-threaded binding stud screwed into the other end of said last-mentioned sleeve-member, and means connected with said binding stud adapted to be brought in engagement with said clamping members for securing the metallic conductor-end of the cable against displacement from within said tubular stud.

5. A connecter and terminal for storage batteries, comprising a pair of sleeve-members, one of said members being provided with a hole having a cylindrical portion and a cone-shaped portion, a binding sleeve in said hole, said sleeve being longitudinally slitted and having a cylindrical portion and a cone-shaped portion adapted to be fitted upon the cylindrical and cone-shaped portions of the said sleeve-member, said binding sleeve being adapted to be fitted upon a battery-post, means connected with said binding sleeve for locking said sleeve-member and said binding sleeve against displacement upon the battery-post, a tubular stud in one end of the other sleeve-member, said tubular stud being adapted to receive the metallic conductor-end of a cable, said tubular stud being further formed with a slitted cone-shaped end-portion providing clamping members, a binding stud in the other end of said second-mentioned sleeve-member, said binding stud having a receiving socket bounded by a marginal portion adapted to be brought in engagement with said clamping members for securing the metallic conductor-end of the cable against displacement from within the tubular stud.

6. A connecter and terminal for storage batteries, comprising a pair of sleeve-members, one of said members being provided with a hole having a cylindrical portion and a cone-shaped portion, a binding sleeve in said hole, said sleeve being longitudinally slitted and having a cylindrical portion and a cone-shaped portion adapted to be fitted upon the cylindrical and cone-shaped portions of the said sleeve-member, said binding sleeve being adapted to be fitted upon a battery-post, means connected with said binding sleeve for locking said sleeve-member and said binding sleeve against displacement upon the battery-post, said other sleeve-member being internally screw-threaded, an externally screw-threaded tubular stud screwed into one end of said last-mentioned sleeve-member, said tubular stud being adapted to receive the metallic conductor-end of a cable, said tubular stud being further formed with a slitted cone-shaped end-portion providing clamping members, an externally screw-threaded binding stud screwed into the other end of said last-mentioned sleeve-member, said binding stud having a receiving socket bounded by a marginal portion adapted to be brought in engagement with said clamping members for securing the metallic conductor-end of the cable against displacement from within the tubular stud.

7. A connecter and terminal for storage batteries, comprising a pair of sleeve-members, one of said members being provided with a hole having a cylindrical portion and a cone-shaped portion, a binding sleeve in said hole, said sleeve being longitudinally slitted and having an externally screw-threaded portion and a cone-shaped portion adapted to be fitted in the hole of said sleeve-member, said screw-threaded portion of the binding sleeve projecting from said hole, said binding sleeve being adapted to be fitted upon a battery-post, a tightening nut upon the projecting screw-threaded portion of said binding sleeve for locking said sleeve-member and said binding sleeve against displacement upon said battery-post, a tubular stud in one end of the other sleeve-member, said tubular stud being adapted to receive the metallic conductor-end of a cable, a binding stud in the other end of said second-mentioned sleeve-member, and means connected with said binding stud adapted to be brought in engagement with said first-mentioned tubular stud for securing the metallic conductor-end of the cable against displacement from within said tubular stud.

8. A connecter and terminal for storage batteries, comprising a pair of sleeve-members, one of said members being provided with a hole having a cylindrical portion and a cone-shaped portion, a binding sleeve in said hole, said sleeve being longitudinally slitted and having an externally screw-threaded portion and a cone-shaped portion adapted to be fitted in the hole of said sleeve-member, said screw-threaded portion of the binding sleeve projecting from said hole, said binding sleeve being adapted to be fitted upon a battery-post, a tightening nut upon the projecting screw-threaded portion of said binding sleeve for locking said sleeve-member and said binding sleeve against displacement upon said battery-post, a tubular stud in one end of the other sleeve-member, said tubular stud being adapted to receive the metallic conductor-end of a cable, said tubular stud being further formed with a slitted cone-shaped end-portion providing clamping members, a binding stud in the other end of said second-mentioned sleeve-member, and means connected with said binding stud adapted to be brought in engagement with said clamping members for securing the metallic conductor-end of the cable against displacement from within said tubular stud.

9. A connecter and terminal for storage batteries, comprising a pair of sleeve-members, one of said members being provided with a hole having a cylindrical portion and a cone-shaped portion, a binding sleeve in said hole, said sleeve being longitudinally slitted and having an externally screw-threaded portion and a cone-shaped portion adapted to be fitted in the hole of said sleeve-member, said screw-threaded portion of the binding sleeve projecting from said hole, said binding sleeve being adapted to be fitted upon a battery-post, a tightening nut upon the projecting screw-threaded portion of said binding sleeve for locking said sleeve-member and said binding sleeve against displacement upon said battery-post, said other sleeve-member being internally screw-threaded, an externally screw-threaded tubular stud screwed into one end of said last-mentioned sleeve-member, said tubular stud being adapted to receive the metallic conductor-end of a cable, an externally screw-threaded binding stud screwed into the other end of said last-mentioned sleeve-member, and means connected with said binding stud adapted to be brought into engagement with said first-mentioned tubular stud for securing the metallic conductor-end of the cable against displacement from within said tubular stud.

10. A conductor and terminal for storage batteries, comprising a pair of sleeve-members, one of said members being provided with a hole having a cylindrical portion and a cone-shaped portion, a binding sleeve in said hole, said sleeve being longitudinally slitted and having an externally screw-threaded portion and a cone-shaped portion adapted to be fitted in the hole of said sleeve-member, said screw-threaded portion of the binding sleeve projecting from said hole, said binding sleeve being adapted to be fitted upon a battery-post, a tightening nut upon the projecting screw-threaded portion of said binding sleeve for locking said sleeve-member and said binding sleeve against displacement upon said battery-post, said other sleeve-member being internally screw-threaded, an externally screw-threaded tubular stud screwed into one end of said last-mentioned sleeve-member, said tubular stud being adapted to receive the metallic conductor-end of a cable, said tubular stud being further formed with a slitted cone-shaped end-portion providing clamping members, an externally screw-threaded binding stud screwed into the other end of said last-mentioned sleeve-member, and means connected with said binding stud adapted to be brought in engagement with said clamping members for securing the metallic conductor-end of the cable against displacement from within said tubular stud.

11. A connecter and terminal for storage batteries, comprising a pair of sleeve-members, one of said members being provided with a hole having a cylindrical portion and a cone-shaped portion, a binding sleeve in said hole, said sleeve being longitudinally slitted and having an externally screw-threaded portion and a cone-shaped portion adapted to be fitted in the hole of said sleeve-member, said screw-threaded portion of the binding sleeve projecting from said hole, said binding sleeve being adapted to be fitted upon a battery-post, a tightening nut upon the projecting screw-threaded portion of said binding sleeve for locking said sleeve-member and said binding sleeve against displacement upon said battery-post, a tubular stud in one end of the other sleeve-member, said tubular stud being adapted to receive the metallic conductor-end of a cable, said tubular stud being further formed with a slitted cone-shaped end-portion providing clamping members, a binding stud in the other end of said second-mentioned sleeve member, said binding stud having a receiving socket bounded by a marginal portion adapted to be brought in engagement with said clamping members for securing the metallic conductor-end of the cable against displacement from within the tubular stud.

12. A connecter and terminal for storage batteries, comprising a pair of sleeve-members, one of said members being provided with a hole having a cylindrical portion and a cone-shaped portion, a binding sleeve in said hole, said sleeve being longitudinally slitted and having an externally screw-threaded portion and a cone-shaped portion adapted to be fitted in the hole of said sleeve-member, said screw-threaded portion of the binding sleeve projecting from said hole, said binding sleeve being adapted to be fitted upon a battery-post, a tightening nut upon the projecting screw-threaded portion of said binding sleeve for locking said sleeve-member and said binding sleeve against displacement upon said battery-post, said other sleeve-member being internally screw-threaded, an externally screw-threaded tubular stud screwed into one end of said last-mentioned sleeve-member, said tubular stud being adapted to receive the metallic conductor-end of a cable, said tubular stud being further formed with a slitted cone-shaped end-portion providing clamping members, an externally screw-threaded binding stud screwed into the other end of said last-mentioned sleeve-member, said binding stud having a receiving socket bounded by a marginal portion adapted to be brought in engagement with said clamping members for securing the metallic conductor-end of the cable against displacement from within the tubular stud.

In testimony that I claim the invention set forth above I have hereunto set my hand this 16th day of December, 1922.

JAMES R. VAN AUKEN.

Witnesses:
   FRED C. FRAENTZEL,
   EVA E. DESCH.